(12) United States Patent
Low et al.

(10) Patent No.: US 7,307,418 B2
(45) Date of Patent: Dec. 11, 2007

(54) SYSTEMS FOR RECORDING POSITION INFORMATION IN A MAGNETIC LAYER ON A PISTON ROD

(75) Inventors: Thomas P. Low, Belmont, CA (US); C. Bruce Clark, Los Altos, CA (US); Ronald E. Pelrine, Louisville, CO (US); Joseph S. Eckerle, Redwood City, CA (US); Chris Smith, San Carlos, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 11/409,576

(22) Filed: Apr. 24, 2006

(65) Prior Publication Data

US 2006/0192552 A1 Aug. 31, 2006

Related U.S. Application Data

(60) Continuation of application No. 11/258,308, filed on Oct. 25, 2005, now Pat. No. 7,034,527, which is a division of application No. 10/840,781, filed on May 6, 2004, now Pat. No. 6,989,669.

(60) Provisional application No. 60/468,507, filed on May 6, 2003.

(51) Int. Cl.
*G01R 33/12* (2006.01)
*G01B 7/14* (2006.01)

(52) U.S. Cl. .................. 324/210; 324/212; 324/213; 324/207.24; 324/207.25

(58) Field of Classification Search ........ 324/210–213, 324/207.24–207.26; 73/514.31, 514.39
See application file for complete search history.

(56) References Cited

U.S. PATENT DOCUMENTS

| 4,028,619 A | 6/1977 | Edwards |
| 4,071,818 A | 1/1978 | Krisst |

(Continued)

FOREIGN PATENT DOCUMENTS

DE 100 20 764 A1 1/2001

(Continued)

OTHER PUBLICATIONS

Mitsubishi Heavy Ind Co Ltd, Piston Rod with Excellent Corrision Resistance- Comprises Steel Treated on its Surface with Iron, Derwent, Acc-No. 1983-08972K, 1 page, Published date: 2000.*

(Continued)

*Primary Examiner*—Bot LeDynh
(74) *Attorney, Agent, or Firm*—Guerin & Rodriguez, LLP; Michael A. Rodriguez

(57) ABSTRACT

Described are system for recording piston rod position information in a magnetic layer on the piston rod. A piston rod has a magnetically hard layer formed thereon to provide a recording medium. A magnetic pattern is recorded in the magnetically hard layer. A magnetic field sensor disposed adjacent to the piston rod senses the recorded magnetic pattern while the piston rod is moving and generates signals in response to the magnetic pattern that are used to determine a position of the piston rod.

18 Claims, 7 Drawing Sheets

U.S. PATENT DOCUMENTS

| | | | |
|---|---|---|---|
| 4,319,188 A | 3/1982 | Ito et al. | |
| 4,631,951 A | 12/1986 | Bohm | |
| 4,678,993 A | 7/1987 | Vinnemann et al. | |
| 4,717,874 A | 1/1988 | Ichikawa et al. | |
| 4,756,229 A | 7/1988 | Drakeley | |
| 4,793,241 A | 12/1988 | Mano et al. | |
| 4,879,555 A | 11/1989 | Ichikawa et al. | |
| 4,904,937 A * | 2/1990 | Takahashi et al. | 324/207.21 |
| 4,951,048 A | 8/1990 | Ichikawa et al. | |
| 5,074,053 A | 12/1991 | West | |
| 5,103,172 A | 4/1992 | Stoll | |
| 5,115,239 A | 5/1992 | Ushiyama | |
| 5,168,274 A | 12/1992 | Wakamatsu | |
| 5,231,352 A | 7/1993 | Huber | |
| 5,412,317 A | 5/1995 | Kyoizumi | |
| 5,438,261 A | 8/1995 | Codina et al. | |
| 5,442,865 A | 8/1995 | Wallrafen | |
| 5,461,311 A | 10/1995 | Nakazato et al. | |
| 5,471,736 A * | 12/1995 | Griebeler | 29/609 |
| 5,497,083 A | 3/1996 | Nakazato et al. | |
| 5,532,598 A | 7/1996 | Clark, Jr. et al. | |
| 5,568,760 A | 10/1996 | Volzer | |
| 5,610,514 A | 3/1997 | Ramaker | |
| 5,652,510 A | 7/1997 | Kyodo | |
| 5,771,141 A * | 6/1998 | Ohtsuka et al. | 360/322 |
| 5,793,201 A | 8/1998 | Nelle et al. | |
| 5,798,640 A | 8/1998 | Gier et al. | |
| 5,811,969 A | 9/1998 | Kyodo | |
| 5,815,091 A | 9/1998 | Dames et al. | |
| 5,886,519 A | 3/1999 | Masreliez et al. | |
| 5,891,514 A * | 4/1999 | Ataka et al. | 427/132 |
| 5,918,199 A | 6/1999 | Yang et al. | |
| 5,955,822 A | 9/1999 | Schutze et al. | |
| 5,955,881 A | 9/1999 | White et al. | |
| 5,973,620 A | 10/1999 | Holzapfel et al. | |
| 6,001,446 A * | 12/1999 | Nakada et al. | 428/832 |
| 6,002,250 A | 12/1999 | Masreliez et al. | |
| 6,005,395 A | 12/1999 | Chan et al. | |
| 6,011,389 A | 1/2000 | Masreliez et al. | |
| 6,029,118 A | 2/2000 | Strasser | |
| 6,034,624 A | 3/2000 | Goto et al. | |
| 6,108,925 A | 8/2000 | Freitag | |
| 6,145,214 A | 11/2000 | Shimano et al. | |
| 6,147,342 A | 11/2000 | Kucher | |
| 6,249,234 B1 | 6/2001 | Ely et al. | |
| 6,271,661 B2 | 8/2001 | Andermo et al. | |
| 6,297,750 B1 | 10/2001 | Wingate et al. | |
| 6,300,758 B1 | 10/2001 | Griffen et al. | |
| 6,327,791 B1 | 12/2001 | Norcross et al. | |
| 6,335,618 B1 | 1/2002 | Nahum | |
| 6,393,963 B1 | 5/2002 | Kadlicko | |
| 6,408,740 B1 | 6/2002 | Holt et al. | |
| 6,418,396 B2 | 7/2002 | Hagl | |
| 6,452,158 B1 | 9/2002 | Whatley et al. | |
| 6,484,620 B2 | 11/2002 | Arshad et al. | |
| 6,486,665 B1 | 11/2002 | Funk et al. | |
| 6,509,773 B2 | 1/2003 | Buchwald et al. | |
| 6,543,149 B1 | 4/2003 | Carlisle | |
| 6,557,452 B1 | 5/2003 | Morroney et al. | |
| 6,573,708 B1 | 6/2003 | Hiramatsu et al. | |
| 6,578,283 B2 | 6/2003 | Nishi | |
| 6,579,634 B2 * | 6/2003 | Saito | 428/845.5 |
| 6,588,313 B2 | 7/2003 | Brown et al. | |
| 6,600,310 B2 | 7/2003 | Nyce et al. | |
| 6,603,115 B1 | 8/2003 | Gordon-Ingram | |
| 6,658,754 B2 | 12/2003 | Omi | |
| 6,670,805 B1 | 12/2003 | Bahr et al. | |
| 6,670,806 B2 | 12/2003 | Wendt et al. | |
| 6,690,160 B2 | 2/2004 | Gray et al. | |
| 6,705,511 B1 | 3/2004 | Dames et al. | |
| 6,846,581 B2 * | 1/2005 | Oikawa et al. | 428/828 |
| 2001/0006744 A1 * | 7/2001 | Saito | 428/694 TM |
| 2001/0038281 A1 | 11/2001 | Nyce et al. | |
| 2002/0017902 A1 | 2/2002 | Vasiloiu | |
| 2002/0157531 A1 | 10/2002 | Kadlicko | |
| 2002/0163330 A1 | 11/2002 | Sekiya | |
| 2003/0010197 A1 | 1/2003 | Zilioli | |
| 2003/0131724 A1 | 7/2003 | Neumann | |
| 2003/0155910 A1 | 8/2003 | Bartingale et al. | |
| 2004/0007125 A1 | 1/2004 | Stobrawe et al. | |

FOREIGN PATENT DOCUMENTS

| | | | |
|---|---|---|---|
| JP | 56142888 A | * | 11/1981 |
| JP | 01309922 A | * | 12/1989 |
| JP | 03265704 A | * | 11/1991 |

OTHER PUBLICATIONS

Duda et al, Plasma Spray Decomposition of a Hard Magnetic Layer, Derwent, Acc-No. 2000-602835, 3 pages; Published date: 1983.*

Written Opinion of the International Searching Authority, Nov. 2004.

* cited by examiner

FIG. 6    DIRECTION OF PISTON ROD MOTION

SYSTEMS FOR RECORDING POSITION INFORMATION IN A MAGNETIC LAYER ON A PISTON ROD

RELATED APPLICATION

This application is a continuation application claiming the benefit of the filing date of U.S. patent application Ser. No. 11/258,308, filed Oct. 25, 2005 now U.S. Pat. No. 7,034,527, titled "Systems of Recording Piston Rod Position Information in a Magnetic Layer on a Piston Rod," the entirety of which U.S. patent application is hereby incorporated by reference.

FIELD OF THE INVENTION

The invention relates generally to methods and systems for measuring the absolute position of a piston rod moving relative to a cylinder. More particularly, the invention relates to systems and methods of determining position, speed, and direction of motion of a piston rod from position information encoded in a magnetic film formed on the piston rod.

BACKGROUND

Various industrial and mobile applications use hydraulic cylinders to control the movement and position of machinery. In general, these cylinders include a cylinder barrel within which a piston is arranged for reciprocating motion along an axis. A piston rod is secured at one end to the piston. The piston rod extends out of one end of the cylinder barrel along the axis of motion. The end of the piston rod that is external to the cylinder barrel is coupled directly or indirectly to a machine component. The piston divides the cylinder barrel into separate chambers. Fluid entering one of the chambers causes the piston and, thus, the piston rod to move relative to the housing. This movement of the piston rod drives the movement of the machine component.

Precise control of the position of the piston is generally fundamental to controlling the operation of the machinery. Measuring the absolute position or velocity of the piston relative to the cylinder is often needed to achieve such control using conventional feedback control techniques. Accordingly, industry has produced various mechanical, magnetic, acoustic, and optical techniques for detecting the instantaneous position of the moving piston or piston rod.

Many position detection systems are expensive, cumbersome, or difficult to mount on the cylinder. Further, position detection systems for hydraulic cylinders often operate in harsh environments caused by internal conditions, such as pressurized fluid that drives the motion of the piston, and external conditions, such as dust and debris. Some types of position detection systems, such as Linear Variable Differential Transformers (LVDTs) and linear scales, can be unreliable or easily damaged in a harsh environment.

Some techniques entail encoding piston rod positions on the position rod itself, and reading the encoded positions as the piston rod moves past a reference point, using a reading technique, e.g., optical, magnetic, mechanical, suited to the particular type of encoding. Some known techniques cut grooves, etch recesses, or marks in the rod. Such modifications, however, can adversely affect the rod's strength. Another known technique, described in the UK Patent Application No. GB 2 096 421, is to encode the position information magnetically in the rod material of the piston rod. Here, the piston rod is constructed of steel and can be magnetized. However, this rod material is magnetically "soft." Magnetically soft material has low coercivity, which is a measure of difficulty for magnetically encoding and erasing information in that material. Thus, the position information encoded in rod material with low coercivity is subject to accidental erasure or alteration.

SUMMARY

In one aspect, the invention features a piston rod position sensing system including a piston rod and a magnetically hard layer formed on the piston rod to provide a recording medium. A magnetic pattern is recorded in the magnetically hard layer. A magnetic field sensor is disposed adjacent to the piston rod to sense the magnetic pattern recorded in the magnetically hard layer while the piston rod is moving and to generate signals in response to the sensed magnetic pattern that are used to determine a position of the piston rod In another aspect, the invention features a piston having a piston rod extending axially therefrom. A magnetically hard layer is formed on the piston rod to provide a recording medium for magnetically storing bits of information along a length of the piston rod.

In yet another aspect, the invention features a piston rod position sensing system comprising a cylinder and a piston arranged within the cylinder for movement therein. The piston has a piston rod extending axially therefrom. A magnetically hard layer is formed on the piston rod to provide a recording medium. A magnetic pattern is recorded in the magnetically hard layer. A plurality of magnetic field sensors are disposed adjacent to the piston rod. Each magnetic field sensor senses a portion of the recorded magnetic pattern while the piston rod is moving relative to the cylinder and generates signals, in response to the sensed portion of the magnetic pattern, for use in determining a position of the piston rod.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features methods and systems for detecting an absolute position, velocity, and direction of motion of a piston rod (or cylinder rod) while the piston rod moves relative to an actuating cylinder. In accordance with the principles of the invention, a physically and magnetically hard material coats the piston rod. Using standard magnetic recording techniques, a magnetic pattern or code is recorded in this coating layer or film of magnetically hard material. As used herein, magnetically "hard" material is material with high coercivity. Magnetic material of high coercivity requires considerable energy to magnetize, i.e., record information, but also to demagnetize recorded information. One or more flux-sensitive magnetic read heads mounted on an end cap of the cylinder read the magnetic pattern. Circuitry in communication with the read heads can process the information obtained from the magnetic pattern to determine the instantaneous incremental position of the piston rod, its velocity, and direction of motion relative to the cylinder.

Various techniques can be used to encode absolute positions of the piston rod in the magnetically hard layer that coats the piston rod. Some techniques record binary codes. Each binary code is uniquely associated with a particular piston rod position. Another technique measures the lateral, spatial distance between two diverging magnetized lines extending along a length of the piston rod. Yet another technique magnetizes an area bounded on two sides by two such diverging lines, extends a sensor (or sensor array) across this bounded area, and correlates the extent of the magnetized area detected by the sensor to a piston rod position. These techniques are illustrative of the many, diverse ways in which position information can be recorded on the piston rod. Other magnetic patterns or encodings can be recorded without departing from the principles of the invention.

Figure 1:
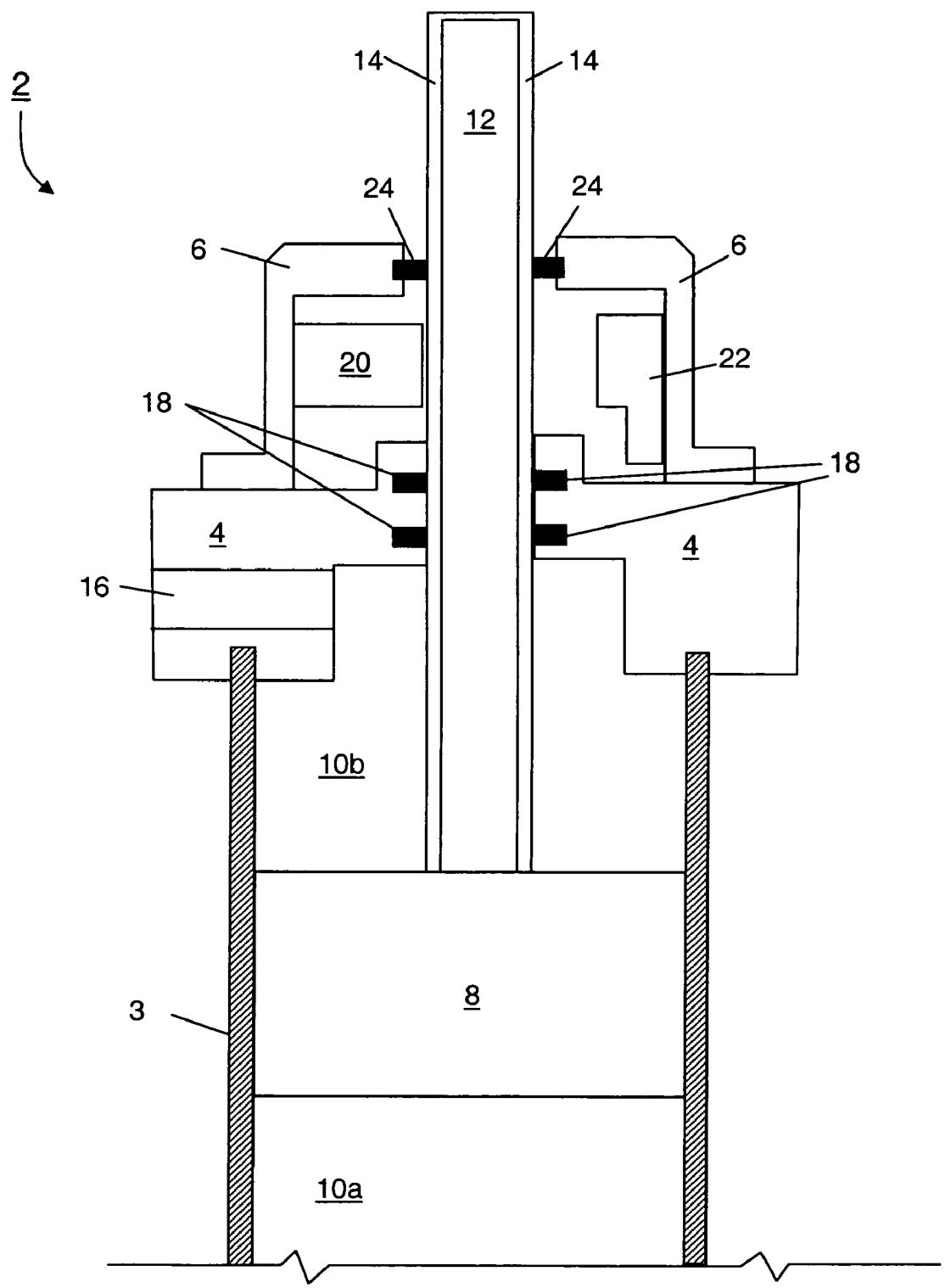
FIG. 1 is a side view of an embodiment of a cylinder, including a piston and a piston rod constructed in accordance with the invention.

FIG. 1 shows a side cross-sectional view of an embodiment of a cylinder 2 including a cylinder barrel 3, a cylinder end cap 4 (also called a "packing gland"), and a housing 6. A piston 8 is arranged within the cylinder barrel 3 for reciprocating motion along an axis. The piston 8 partitions the cylinder barrel 3 into two chambers 10a and 10b.

One end of a piston rod 12 is secured to the piston 8 and extends along the axis of motion. The other end of piston rod 12 extends out of the housing 6 through the end cap 4, and may be coupled directly or indirectly to a machine component. Typically, the piston 8 and piston rod 12 are constructed of steel (i.e., a ferromagnetic material). In the embodiment shown, the piston rod 12 is cylindrical; other piston rod shapes can be employed without departing from the principles of the invention. In accordance with the invention, a magnetically hard film or layer 14 coats the piston rod 12 to provide a recording medium. This coating can be continuous or discontinuous on the piston rod 12 and cover a portion or all of the piston rod 12. For example, typically the magnetically hard layer 14 is not formed on the end of the piston rod 12. A pattern or code is magnetically recorded in the magnetically hard layer 14 along a length of the piston rod 12, as described in more detail below.

The end cap 4 has a channel 16 for the passage of fluid (e.g., oil, water, steam, gas) into and out of the chamber 10b, for moving the piston 8. A fluid passageway to the other chamber 10a is not shown. Seals 18 within the end cap 4 are arranged to lie flush with a surface of the piston rod 12 and thus prevent fluid from leaving the chamber 10b.

The housing 6 encloses a plurality of flux-sensitive magnetic read heads 20 and read-head electronics 22. Only one read head is shown in FIG. 1 to simplify the illustration. Read heads 20 can be Hall-effect devices or magnetoresistive sensors. The location of the read head 20 within the housing 6 provides protection from the environment and permits ready access for easy replacement (i.e., the housing 6 can be removed without removing the end cap 4 from the cylinder 2). The read heads 20 are mounted in the housing 6 within proximity of the piston rod's surface to permit reading of the encoded position information in the magnetic pattern recorded in the magnetically hard layer 14. The housing 6 also includes a rod wiper 24 for wiping away small magnetizable particles that may adhere to the piston rod 12. In another embodiment, the end cap 4 houses the read heads 20 and read head electronics 22. In such an embodiment, the housing 6 is optional because the end cap 4 can protect the read heads 20 from the harsh operating environment.

In brief overview, fluid within the chambers 10a, 10b at time-varying, differential pressures causes the piston 8 and thus the piston rod 12 to move in and out relative to the read heads 20. The read heads 20 read the recorded magnetic pattern on the piston rod 12 and produce a corresponding analog or digital signal. From the combined instantaneous readings of the read heads 20, the read-head electronics 22 can determine the actual piston rod position, velocity, and direction, or any combination thereof.

Figure 2A:
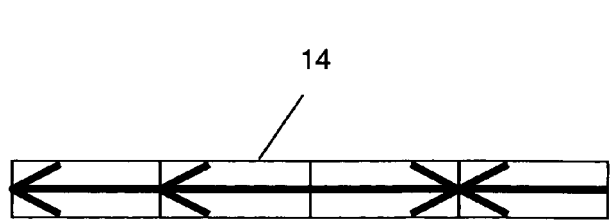
FIG. 2 is a simplistic diagrammatic view of two techniques for magnetically recording information on the piston rod.
Figure 2B:
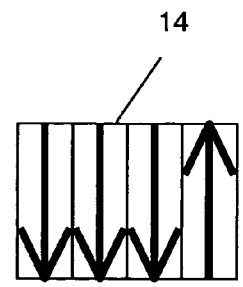

FIG. 2A and FIG. 2B are diagrammatic views of two standard magnetic recording techniques for magnetically recording binary information in the magnetically hard layer 14 of FIG. 1. A write transducer (i.e., a pole write head) can magnetize the magnetically hard layer 14 with an identifiable magnetic pattern in one of two standard ways: 1) longitudinal; and 2) perpendicular. When a current is applied to the write transducer, an external field is generated, thereby aligning the magnetic domains within the magnetically hard layer 14. Write transducers are currently able to record on the order of tens of megabits per square inch.

In longitudinal media, the magnetization lies in the plane of the magnetically hard layer 14, which is shown in FIG. 2A as left and right arrows. The magnetic pattern of longitudinal recording media consists of "transitions," i.e., head-to-head reversals of the in-plane magnetization from one polarity to the other. Such a reversal is marked by the existence of magnetic poles whose stray flux is sensed by the read head 20 located above the medium. In perpendicular media, the magnetization is perpendicular to the plane, shown as up and down arrows in FIG. 2B. Here, the magnetic marking occurs by creating transitions between regions magnetized "up" and "down."

Longitudinal and perpendicular recording media can both be produced by electrochemical methods (e.g., electroless, electroplating, chemical vapor deposition, and electrochemical deposition (sputtering)). For longitudinal and perpendicular recording media, the materials used are often cobalt-based alloys. Pure cobalt (Co) can be used to produce a magnetic film of high coercivity, but alloying elements are typically used to tailor the magnetic properties of the recording media and to increase its coercivity. Examples of alloying elements capable to include group VA (P, As, Sb, Bi) and VIB (Cr, Mo, W) elements and the noble elements Pt and Pd. For longitudinal media, example alloys include Co—P, Co—Ni—P, Co—W, and Co—Mo. For perpendicular media, example alloys include Co—P based, Co—W, and Co—Cr. Approximate high coercivity values obtained from using such Co-based alloys range from 1-2 kOe.

Embodiments of the magnetically hard layer 14 can be synthesized with such materials to produce a magnetic layer with high coercivity. Magnetic layers or films of high coercivity, such as the magnetically hard layer 14, can maintain recorded information under external stray fields and under the demagnetization fields deriving from the imposed magnetic transitions. This magnetically hard layer 14 may also provide good mechanical and corrosion resistance. However, considering the harsh operational environment of the cylinder 2, the magnetically hard layer 14 can be coated to insure sufficient resistance to mechanical wear and corrosion. One example of such a protective layer can be hard chrome, i.e., a Cr layer.

Figure 3:
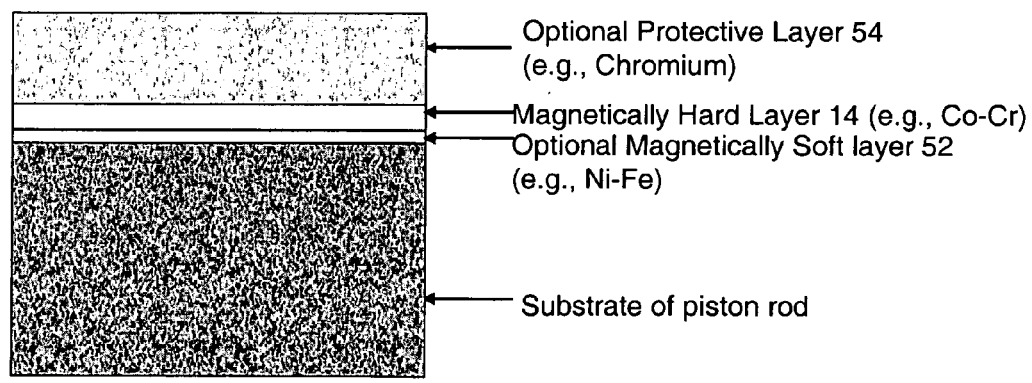
FIG. 3 is a cross-sectional view of the various layers and their relative thicknesses deposited on the piston rod, the layers including a magnetic film that provides a recording medium for storing encoded rod position information.

FIG. 3 shows a cross-sectional view of one embodiment of a portion of the piston rod 12, including a substrate 50, an optional intermediate layer 52, the magnetically hard layer 14, and an optional protective layer 54. Generally, the substrate 50 can be magnetic or non-magnetic, that is, although typically ferromagnetic (e.g., a steel rod), the piston rod 12 can be constructed of non-magnetic material (e.g., plastic, aluminum, ceramic, or glass) without departing from the principles of the invention. The layers 14, 52, and 54 can cover all or a portion of the piston rod 12. For example, the magnetically hard layer 14 (and the optional layers 53, 54) are not typically applied to the end of the piston rod 12, in particular, to those one or more portions of the piston rod 12 that do not pass near enough the read heads 20 for sensing.

The composition of the intermediate layer 52 depends upon the type of the recording media and of the substrate material. For longitudinal media, for instance, a ferromagnetic substrate can pose a problem for information retention. Being magnetically permeable, the ferromagnetic substrate provides a low reluctance path for the flux, which, in effect, shunts and reduces the flux available to be sensed. For embodiments in which the magnetically hard layer 14 is produced as longitudinal media, the intermediate layer 52 can be a non-magnetic amorphous layer, such as Ni—P, to obstruct the low reluctance path. Because non-magnetic substrates lack the permeability of ferromagnetic substrates, use of such an intermediate layer 52 is optional for non-magnetic substrates.

For perpendicular media, the permeability of a ferromagnetic substrate serves an advantage. The return path in a ferromagnetic substrate between adjacent oppositely magnetized regions does not affect the stray flux in the region above the magnetically hard layer 14, and assists in the write process and in the retention of the written information. Lacking such permeability, non-magnetic substrates lack such beneficial properties for information retention. To improve the information retention of perpendicular media on non-magnetic substrates, the intermediate layer 52 can be as a magnetically soft layer (e.g., permalloy or Ni—Fe). The permeability of a ferromagnetic substrate 50, however, makes use of the magnetically soft intermediate layer 52 optional; although use of the magnetically soft intermediate layer 52 can mask unreliable or non-uniform permeability of the ferromagnetic substrate 50, and therefore its presence can be beneficial.

FIG. 3 also shows the relative thicknesses of the layers 14, 52, and 54 on the magnetic substrate 50 of this embodiment of the piston rod 12. In an embodiment employing a perpendicular recording medium, the magnetically hard layer 14 is approximately 5 um thick, the protective layer 54 is approximately 25 um thick, and the intermediate layer 52, here, a magnetically soft layer (e.g., permalloy), is approximately 1-2 um thick. The thickness of the protective layer 54 affects the resolution of the piston rod position sensing system by limiting how near the read heads 20 can be to the magnetically hard layer 14. For example, with a 25 um thick protective layer 54, bits may need to be spaced apart by at least 25 um (approximately) for the read heads 20 to be able to distinguish between them. In embodiments without the protective layer 54, the bits can be located more closely together because the read heads 20 can directly contact the encoded magnetically hard layer 14. The particular thicknesses shown in FIG. 3 provide an illustrative example; other thicknesses for the layers 14, 52, and 54 can be used to practice the invention.

Piston rod position information can be recorded in the magnetically hard layer 14 of the piston rod 12 in a multitude of ways. Some techniques explicitly record the identities of the absolute piston rod positions on the piston rod 12 (e.g., using binary code), other techniques magnetize shapes in or regions of the magnetically hard layer 14 from which piston rod positions can be computed. Herein, a magnetic pattern means generally any type of magnetically recorded that directly or indirectly identifies a piston rod position.

Binary code representing the particular absolute positions can appear on the piston rod 12 in at least two general directions: 1) around the circumference of the piston rod 12 (or laterally); and 2) along a length of the piston rod 12. In the first instance, the binary code representing a particular piston rod position is read concurrently by multiple read heads. The combined concurrent readings of the read heads produce that particular position. In the second instance, a single read head reads the binary code representing a particular piston rod position.

Figure 4:
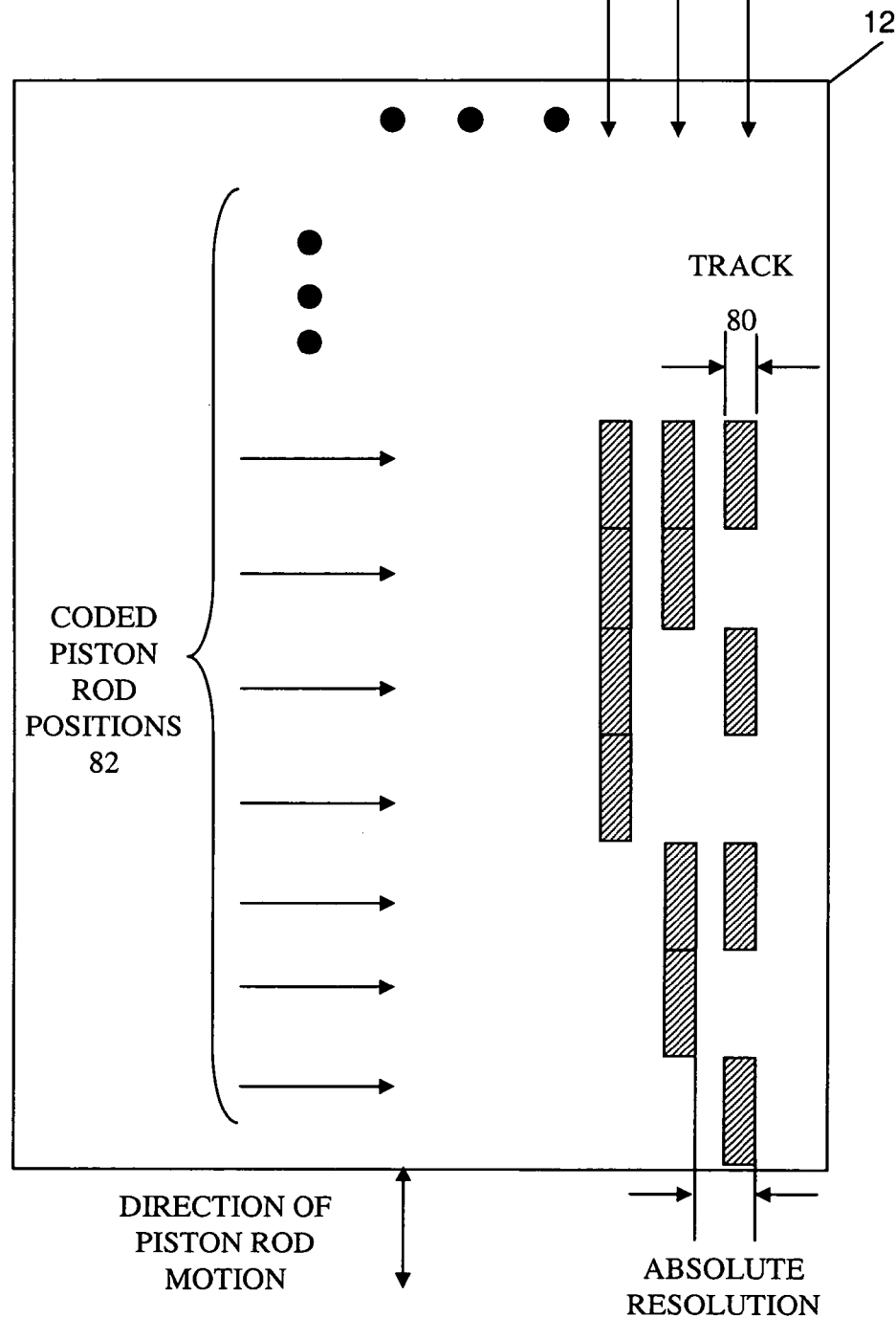
FIG. 4 is a two-dimensional view of a cylindrical piston rod showing a plurality of tracks in which bits of information are stored, the particular arrangement and values of these bits in the tracks providing one embodiment of an encoded pattern from which the absolute position, velocity, and direction of motion of the piston rod can be determined.
Figure 5:
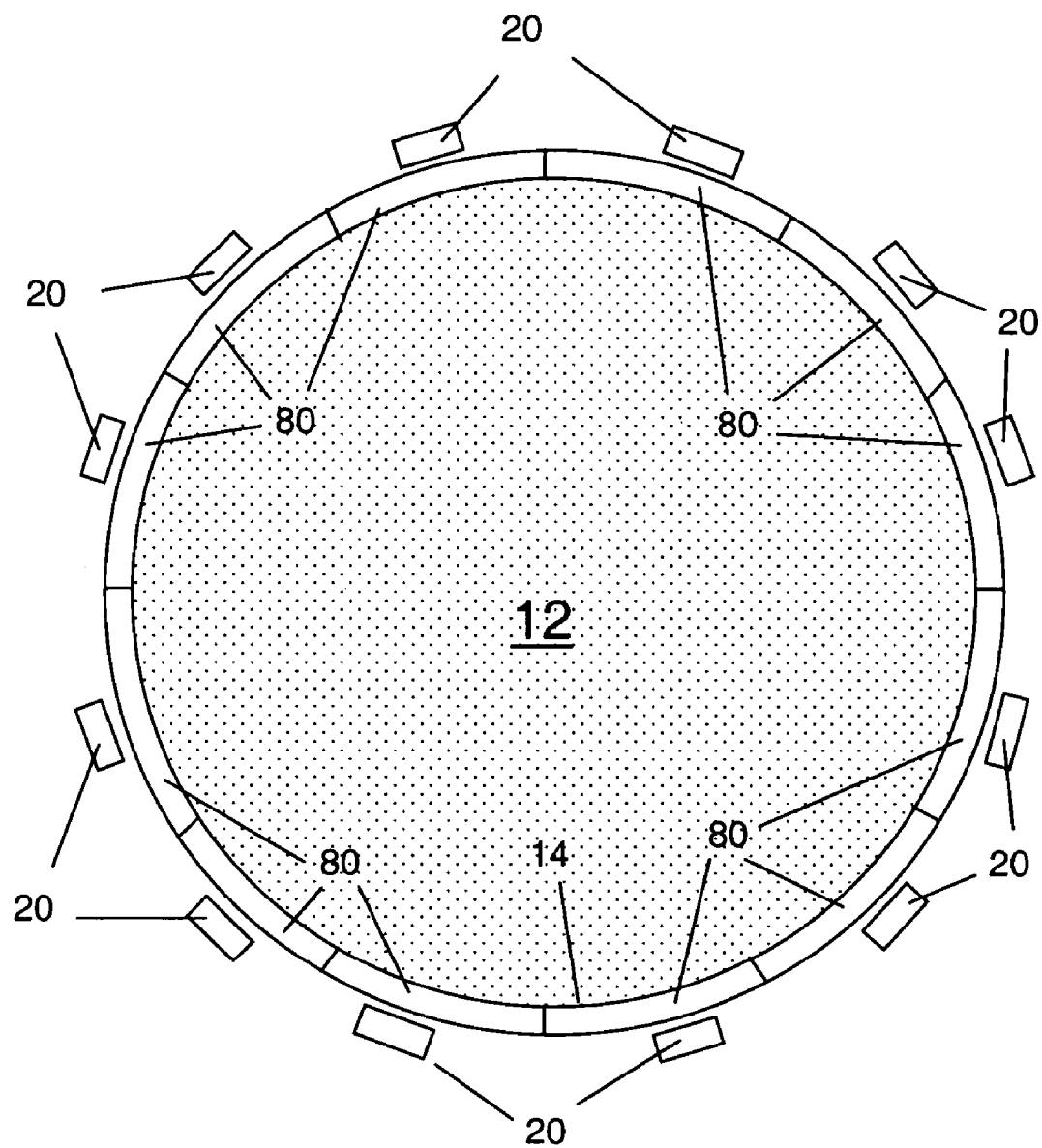
FIG. 5 is an end view of the cylindrical piston rod and a plurality of read heads positioned near the rod to read the bits of stored information from each of the tracks.

FIG. 4 shows an embodiment in which piston rod positions are encoded circumferentially around the piston rod 12. This embodiment is merely exemplary of circumferential magnetic patterns for representing piston rod positions. Others can be used without departing from the principles of the invention. Shown in two dimensions, the cylindrical piston rod 12 is partitioned into a plurality of tracks 80 into which bits of information are magnetically recorded. The tracks 80 extend lengthwise along the piston rod 12 along the direction of the reciprocating motion of the piston 6. The width of each track 80 spans a particular degree range of the cylindrical piston rod 12. Each track is read by one read head 20 (FIG. 1). For example, for a piston rod 12 with twelve tracks 80, each track 80 spans an arc of 30 degrees, and twelve read heads 20 each read the bits recorded in one of the tracks 80. FIG. 5 shows a cross-sectional view of the cylindrical piston rod 12 and a plurality of read heads 20 positioned near a surface of the rod to read the bits of stored information from each of the tracks 80.

Returning to FIG. 4, position identifying binary code is magnetically written onto these twelve tracks. Each identifiable piston rod position 82 wraps around the circumference of the piston rod 12. The binary information recorded in the tracks 80 for each position 82, when read together, uniquely identifies that piston rod position. In this example, each unique binary code for a given position is twelve tracks wide. To ensure that a given read head 20 is reading bit information from the desired track 80, in one embodiment the piston rod 12 is not be permitted to rotate more than the width of a single track. In another embodiment, the precise location of each read head 20 is used to detect rotational movement of the piston rod 12. Error detection code can also be used so that misread code does not cause an error in positioning. An advantage of this arrangement is that resolution of known absolution piston rod positions can be almost as small as the physical size of one bit. For magnetic encodings, the size of each bit is between 0.001 and 0.002 inches.

The desired spatial resolution between identifiable magnetically recorded bits and the length of the piston rod 12 are factors in determining the number of unique binary codes needed to identify each piston rod position uniquely. For example, consider a 55-inch piston rod for which 0.04 inch resolution is desired. Such a position detection system requires 1375 unique binary codes to identify uniquely each of the 1375 positions on the piston rod 12 (55/0.04). Accordingly, at least eleven bits are needed to represent each piston rod position. Eleven tracks 80 and eleven read heads 20 are used to read the eleven bits. Additional bits, tracks and read heads may be used in this example for purposes other than uniquely identifying piston rod position, such as for detecting piston rod rotation and for performing error code correction.

In FIG. 4, a simplistic example is shown of a binary code that can be used to identify incremental piston rod positions. For this example, shaded regions signify regions of the magnetically hard layer 14 that have a recorded bit value of 1. Non-shaded regions signify recorded bit values of 0. Starting from the bottom of FIG. 4, with the rightmost bit being the least significant bit, the binary coded piston rod positions 82 that are shown are identified by code values 1 through 7.

A position sensing system of the invention determines the absolute position of the piston rod 12 whenever the read heads 20 read the present encoding. The read head electronics 22 can compute the velocity of the piston rod 12 from multiple readings of the instantaneous absolute position. From the multiple absolute position readings, the electronics 22 can compute the distance traveled by the piston rod 12 and divide that distance by the time between readings. A comparison of absolute positions also enables a determination of the direction in which the piston rod 12 is moving.

Figure 6:
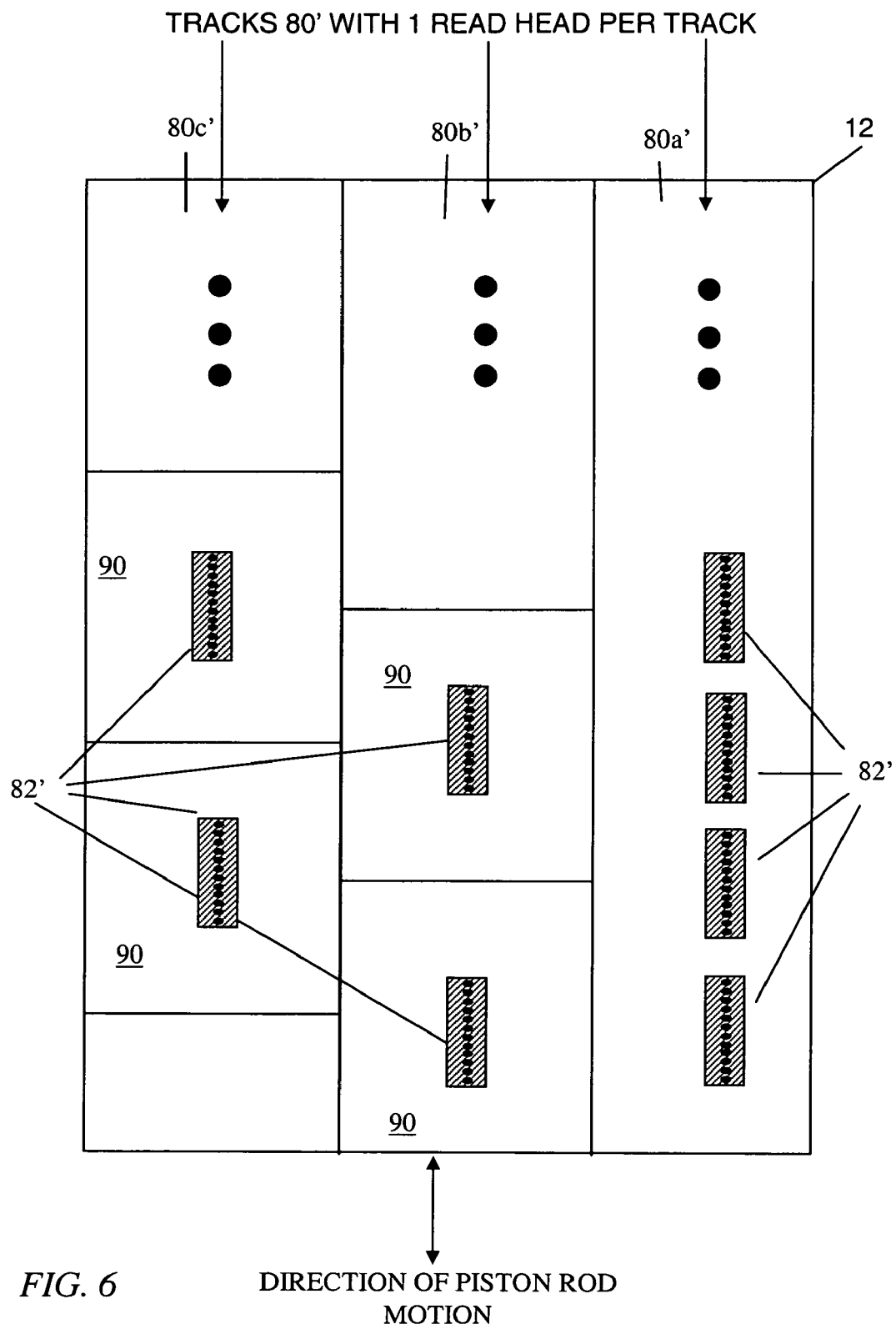
FIG. 6 is a two-dimensional view of a cylindrical piston rod showing a plurality of tracks in which bits of information are stored, the particular arrangement and values of these bits in the tracks providing another embodiment of an encoded pattern from which the absolute position, velocity, and direction of motion of the piston rod can be determined.

FIG. 6 shows an embodiment in which piston rod positions are encoded lengthwise on the piston rod 12. Shown in two dimensions, the cylindrical piston rod 12 is partitioned into a plurality of tracks 80' (here, three tracks) into which bits of information are magnetically recorded. Each track is read by one read head 20. An additional read head can be used to detect rotation of the piston rod 12. The tracks 80' extend lengthwise along the piston rod 12 along the direction of the reciprocating motion of the piston rod 12. The width of each track 80' spans a particular degree range of the cylindrical piston rod 12. For example, for a piston rod 12 with three tracks 80', each track 80' spans an arc of 120 degrees.

Magnetically written onto each of these tracks 80' are words 82'. Each word 82' includes a magnetic pattern of binary information that uniquely identifies a particular piston rod position. For example, 12 bits of information can uniquely identify, with 0.04-inch resolution, the 1375 piston rod positions in the exemplary 55-inch piston rod 12 described above. In an embodiment in which the magnetically hard layer 14 is protected by a hard chrome or Cr-layer having 0.001-inch thickness, a 12-bit word can be magnetically recorded in a linear space of approximately 0.012 inches.

In one of the tracks 80a', the words 82' identifying the absolute piston rod positions are incrementally recorded along the length of the piston rod 12. This track 80a' includes a word 82' for each desired absolute position (e.g., 1375 words in 0.04-in increments for the exemplary 55-inch piston rod described above).

The other two tracks 80b' and 80c' are partitioned into regions 90. The regions 90 within the track 80c' are staggered with respect to the regions 90 in the track 80b'. The identities of positions represented by the words 82' are also staggered: even-numbered positions are coded in track 80b' and odd-numbered positions are coded in track 80c'. Staggering the words 82' in this fashion uses less length of the piston rod 12 to represent 1375 unique positions than the incremental technique employed in track 80a'.

One implication of lengthwise words is that in the event of a loss of power, the piston rod 12 needs to move a certain distance before the position sensing system can know its current position. In this respect, this embodiment of a position-sensing system is pseudo-absolute. This distance corresponds to the absolute resolution of a word (i.e., the physical word length). In the example described above having 12-bit words, this distance is 0.012 inches. To eliminate any need for initial movement before being able to detect a piston rod position, a battery backup can be included in the system to maintain the last known piston position and movement direction when the power was lost.

The embodiment shown in FIG. 6 is merely exemplary of lengthwise magnetic patterns for representing piston rod positions. Other examples include, but are not limited to, a single track having each possible piston rod position, such as track 80a' or just the two tracks 80b' and 80c'.

Figure 7:
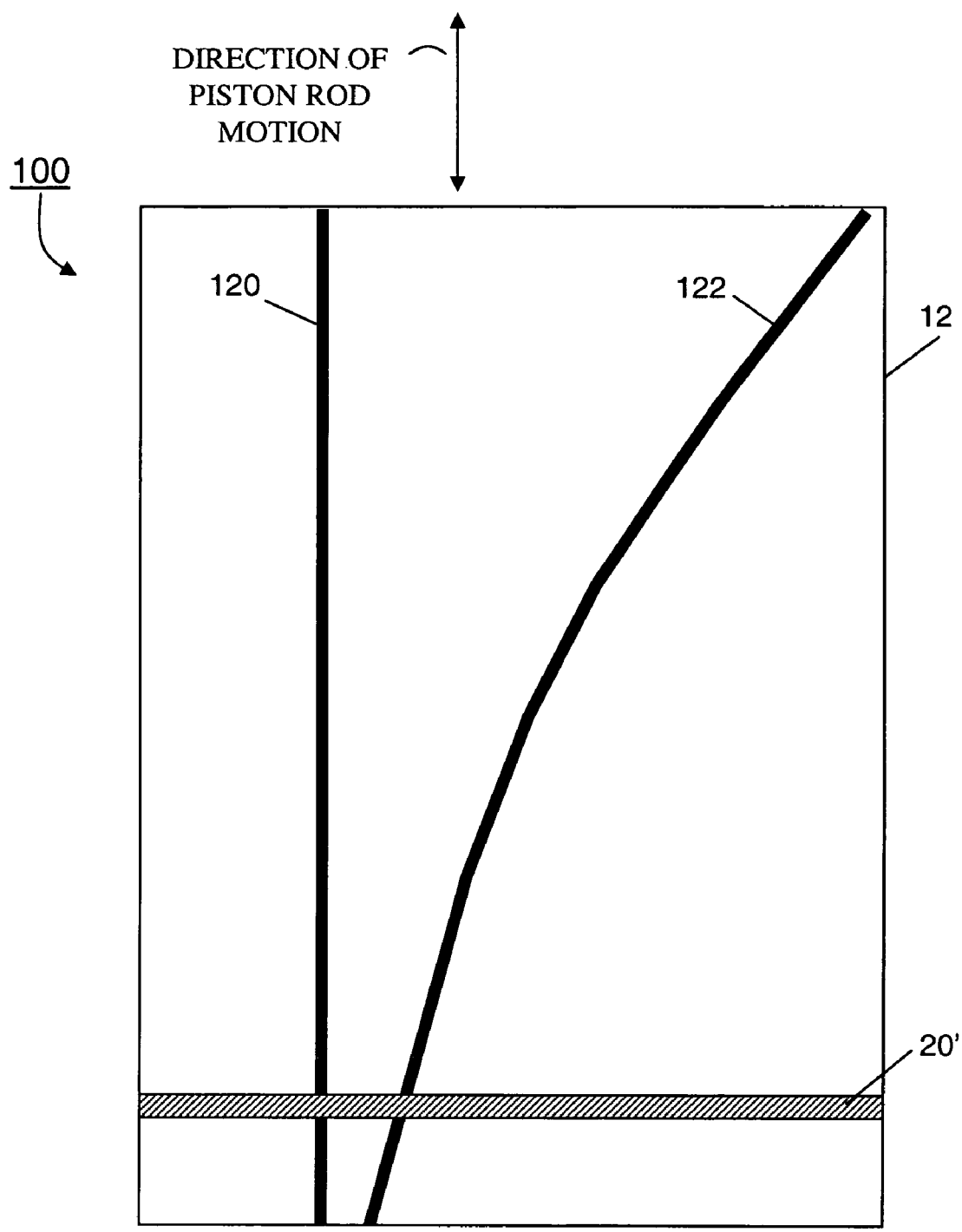
FIG. 7 is a two-dimensional view of a cylindrical piston rod showing an embodiment of a pair of magnetized lines extending along a length of the piston rod and illustrating another embodiment of an encoded pattern from which the absolute position, velocity, and direction of motion of the piston rod can be determined.

FIG. 7 shows an embodiment of a magnetic pattern 100 recorded in the magnetically hard layer 14 and from which piston rod position, velocity, and direction of motion can be determined. Here illustrated in two dimensions, the magnetic pattern 100 includes a pair of magnetized lines 120, 122 extending along a length of the piston rod 12. The lines 120, 122 are recorded in the magnetically hard layer 14. The first line 120 extends in the direction of motion of the piston rod 12 and parallel to the axis of the piston rod 12. The second line 122 extends away from the first straight line 120, diagonally for a planar embodiment, helically for a cylindrical embodiment. In the helical embodiment, the second line 122 does not make one full revolution around the circumference of the piston rod 12 so as to avoid intersecting the first straight line 120.

An array of sensors 20' (diagonal-shaded box) mounted in the housing 6 (FIG. 1) magnetically senses the two magnetized lines 120, 122. Sensors can be standard Hall-effect sensors or constructed from magnetoresistive material (i.e., permalloy) deposited on a copper cladding and selectively etched (the cladding and permalloy) to leave and array of individual sensors.

Signals generated by the array of sensors 20' enable the read head electronics 22 (FIG. 1) to compute the current distance between the lines 120, 122. Because the lines 120, 122 diverge from each other, the measured distance is uniquely associated with a particular absolute piston rod position (a lookup table can store these associations). The distance between any two sensors in the sensor array 124 is sufficient to establish the position of the piston rod 12. There is no need for the lines 120, 122 to be oriented relative to a single sensor or for the sensor array to be uniquely positioned, initially or during operation. Accordingly, the piston rod 12 can rotate during operation without affecting the sensing of position, velocity, or direction of motion.

Consider, for example, a piston rod having a 3.5-inch diameter and a 55-inch length and a specified resolution of 0.04 inches: a 0.04-inch lengthwise movement of the piston rod 12 corresponds to a 0.08-in increase in the distance between the two lines 120, 122. This lengthwise movement of 0.08 inch, when spread over the circumference of the piston rod 12, corresponds to 1375 unique piston rod positions. An array of 1375 sensors can be used to sense the two lines 120, 122. The use of shorter piston rods (than 55 inches) enables the use of fewer sensors. Alternatively, another magnetized line in parallel with one of the other lines 120, 122, enables doubling the length of the piston rod without increasing the number of sensors. Also, if the length of the piston rod 12 is such that a single helical revolution of the line 122 does not provide sufficient positional sensitivity, a second helical revolution about the piston rod 12 can be made. In another embodiment, the magnetized lines 120, 122 both extend helically around the circumference of the piston rod 12, but in opposite rotational directions of each other.

From multiple readings of the absolute position of the piston rod 12, the read head electronics 22 can compute the velocity of the piston rod 12. For example, the read head electronics 22 can compute the distance traveled by the piston rod 12 from a first absolute position to a second absolute position, and divide that distance by the time between position readings. A comparison of absolute positions also enables a determination of the direction in which the piston rod 12 is moving. For example, an increase or decrease in the measured distance from one position reading to a subsequent position reading can be used to identify the movement direction.

Figure 8:
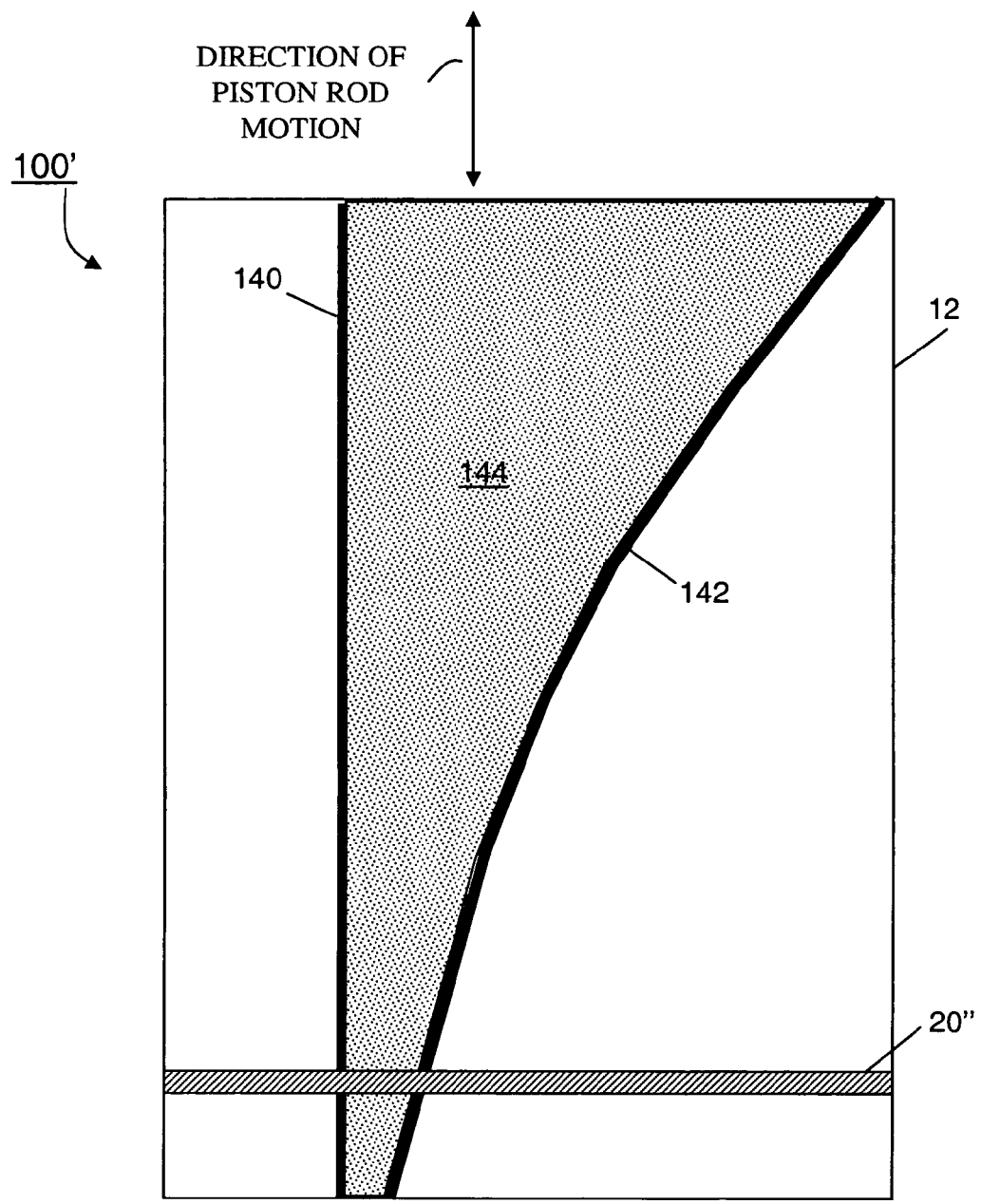
FIG. 8 is a two-dimensional view of a cylindrical piston rod showing an embodiment of a magnetized region extending along a length of the piston rod and illustrating another embodiment of an encoded pattern from which the absolute position, velocity, and direction of motion of the piston rod can be determined.

FIG. 8 shows, in two dimensions, another embodiment of a magnetic pattern 100' recorded in the magnetically hard layer 14 and from which piston rod position, velocity, and direction of motion can be determined. The magnetic pattern 100" includes a pair of boundary lines 140, 142 extending along a length of the piston rod 12. The first straight boundary line 140 extends in the direction of motion of the piston rod 12 and parallel to the axis of the piston rod 12. The second boundary line 142 extends away from the first straight line 120, diagonally for a planar embodiment, helically for a cylindrical embodiment. In the helical embodiment, the second boundary line 142 does not make one full revolution around the circumference of the piston rod 12 so as to avoid intersecting the first boundary line 140. In this embodiment, the boundary lines 140, 142, and the region 144 (shown shaded) bounded by the boundary lines 140, 142 are magnetized.

A sensor 20" (diagonal-shaded box) is mounted in the housing 6 (FIG. 1) to extend across the magnetized region 144. As the piston rod 12 moves, the extent of the magnetized region 144 covered by the sensor 20" changes because the lines 140, 142 diverge. The sensor 20" produces a signal (e.g., analog or digital) that depends upon the detected extent of coverage and serves, directly or indirectly, as a measurement of this coverage. The readings of the sensor 20" are then used to compute the position of the piston rod 12. Each absolute piston rod position is uniquely associated with a particular measure of coverage (a lookup table can store these associations). Velocity can be computed from multiple readings of the absolute position as a measure of the distance traveled by the piston rod 12 from a first measurement to a second measurement divided by the time between measurements. A comparison of measurements also enables a determination of the direction in which the piston rod 12 is moving. For example, an increase or decrease in the measured amount of magnetized region 44 covered by the sensor 20" from one measurement to a subsequent measurement can be used to identify the movement direction.

Although the invention has been shown and described with reference to specific preferred embodiments, it should be understood by those skilled in the art that various changes in form and detail may be made therein without departing from the spirit and scope of the invention as defined by the following claims. For example, although the embodiments described above relate primarily to sensing piston rod position for linear movement, the principles of the invention can be used to determine position, velocity, and movement direction for objects that rotate with respect to each other.

What is claimed is:

1. A piston rod position sensing system, comprising:
a ferromagnetic steel piston rod;
a magnetically hard layer formed on the ferromagnetic steel piston rod to provide a recording medium, a magnetic pattern being recorded in the magnetically hard layer, wherein the magnetic pattern includes a first magnetized line extending parallel to an axis of the piston rod and a second magnetized line extending along a length of the piston rod and diverging away from the first magnetized line; and
a magnetic field sensor disposed adjacent to the piston rod to sense the magnetic pattern recorded in the magnetically hard layer while the piston rod is moving and to generate signals, in response to the sensed magnetic pattern, that are used to determine a position of the piston rod.

2. The piston rod position sensing system of claim 1, further comprising a magnetically soft layer disposed between the magnetically hard layer and the piston rod.

3. The piston rod position sensing system of claim 1, further comprising a non-magnetic layer disposed between the magnetically hard layer and the piston rod.

4. The piston rod position sensing system of claim 1, further comprising a protective layer disposed on the magnetically hard layer.

5. The piston rod position sensing system of claim 1, wherein an area bounded by the first and second magnetized lines is magnetized.

6. The piston rod position sensing system of claim 1, further comprising circuitry for computing one of a velocity and a direction of motion of the piston rod from readings of the magnetic pattern.

7. A piston comprising:
a ferromagnetic steel piston rod extending axially from the piston; and
a magnetically hard layer formed on the ferromagnetic steel piston rod to provide a recording medium for magnetically storing bits of information along a length of the piston rod, a magnetic pattern being recorded in the magnetically hard layer, wherein the magnetic pattern includes a first magnetized line extending parallel to an axis of the piston rod and a second magnetized line extending helically along a length of the piston rod.

8. The piston of claim 7, wherein an area between the first and second magnetized lines is magnetized.

9. The piston of claim 7, further comprising a magnetically soft layer disposed between the magnetically hard layer and a magnetic substrate of the rod.

10. The piston of claim 7, further comprising a non-magnetic layer disposed between the magnetically hard layer and a surface of the piston rod.

11. The piston of claim 7, further comprising a protective layer disposed on the magnetically hard layer.

12. A piston rod position sensing system, comprising:
a cylinder;
a piston arranged within the cylinder for movement therein, the piston having a ferromagnetic steel piston rod extending axially from the piston;
a magnetically hard layer formed on the ferromagnetic steel piston rod to provide a recording medium, a magnetic pattern being recorded in the magnetically hard layer, wherein the magnetic pattern includes a first magnetized line extending parallel to an axis of the piston rod and a second magnetized line extending along a length of the piston rod and diverging away from the first magnetized line; and
a plurality of magnetic field sensors disposed adjacent to the piston rod, each magnetic field sensor sensing a portion of the recorded magnetic pattern while the piston rod is moving relative to the cylinder and generating signals, in response to the sensed portion of the magnetic pattern, for use in determining a position of the piston rod.

13. The piston rod position sensing system of claim 12, further comprising a magnetically soft layer disposed between the magnetically hard layer and the piston rod.

14. The piston rod position sensing system of claim 12, further comprising a non-magnetic layer disposed between the magnetically hard layer and the piston rod.

15. The piston rod position sensing system of claim 12, further comprising a protective layer disposed on the magnetically hard layer.

16. The piston rod position sensing system of claim 12, wherein an area bounded by the first and second magnetized lines is magnetized.

17. The piston rod position sensing system of claim 12, further comprising circuitry for computing one of a velocity and a direction of motion of the piston rod from readings of the magnetic pattern.

18. A piston rod position sensing system, comprising:
a ferromagnetic steel piston rod; and
magnetically hard layer formed directly on an outer surface of the ferromagnetic steel piston rod to provide a recording medium in which a magnetic pattern is recorded longitudinally, wherein the magnetic pattern includes a first magnetized line extending parallel to an axis of the piston rod and a second magnetized line extending along a length of the piston rod and diverging away from the first magnetized line.

* * * * *